United States Patent Office 3,420,775
Patented Jan. 7, 1969

3,420,775
PREVENTION OF SCALE IN SALINE WATER EVAPORATORS USING CARBON DIOXIDE UNDER SPECIAL CONDITIONS
Edgar A. Cadwallader, 4406 Mahan Road, Silver Spring, Md. 20906
No Drawing. Filed July 5, 1967, Ser. No. 651,143
U.S. Cl. 210—48    4 Claims
Int. Cl. C23f 14/02; C02b 1/00

ABSTRACT OF THE DISCLOSURE

The removal of the scale forming elements of calcium and magnesium either separately or together from saline waters is accomplished by injecting carbon dioxide gas, in a controlled manner, into a closed or pressurized system containing said waters. The carbon dioxide reacts with the water to produce the soluble bicarbonate ions, which hold these scale forming elements in solution. After said saline water has been supersaturated with carbon dioxide, said saline water flows into a pressure release chamber whereupon the sudden release of the pressure causes these bicarbonates to decompose into carbon dioxide gas and carbonate ions which precipitate calcium as calcium carbonate. Further breakdown of the carbonate ion produces more carbon dioxide and hydroxyl ions which precipitate magnesium as magnesium hydroxide. These precipitates are then removed from the system and scale formation on the vital parts of the system is avoided.

BACKGROUND OF THE INVENTION

Field of the invention.—This invention relates to the prevention of scale which is formed during desalination of sea or brackish waters by evaporation. In this connection, the removal of substantial amounts of calcium and magnesium from sea or brackish waters prior to evaporation is important in order to avoid the formation of scale on the evaporator heat transfer surfaces. When sea water, for example, is evaporated, calcium carbonate magnesium hydroxide, and calcium sulfate precipitate under certain conditions to form scale on the heat transfer surfaces of the distillation plants. This scale formation consequently reduces the production and efficiency of these plants. The net effect is to increase plant operating costs and ultimately the cost of the product water itself.

DESCRIPTION OF PRIOR ART

The evaporation of untreated sea water is accompanied by the formation of scale on the heat transfer surfaces of the evaporator or distilling plant. This precipitation of scale is caused by physical and chemical changes which occur when said water is heated. For example, calcium carbonate scale results from the thermal decomposition of the bicarbonates in sea water. The bicarbonate ion normally present in sea water breaks down on heating to form carbon dioxide and the carbonate ion (Eq. 1). The calcium in the sea water is then precipitated as calcium carbonate (Eq. 2).

(1)    $2HCO_3^- \rightarrow CO_2 + CO_3^{--} + H_2O$ (2)    $Ca^{++} + CO_3^{--} \rightarrow CaCO_3$ Continued heating of the sea water causes the carbonates to react with water to release more carbon dioxide and form the hydroxyl ion which precipitates as magnesium hydroxide as shown in Equations 3 and 4.

(3)    $CO_3^{--} + H_2O \rightarrow CO_2 + 2OH^-$ (4)    $Mg^{++} + 2OH^- \rightarrow Mg(OH)_2$ The third predominating scale, calcium sulfate, precipitates from sea water under conditions of either high temperatures or high concentrations. This chemical compound is not attacked by usual chemical means and it is the most tenacious of scales. It is responsible for reduction in production and efficiency in sea water plants operating at temperatures above 250° F. or sections of a conversion plant which are evaporating concentrated sea water brines at lower temperatures. Equation 5 shows its formation.

(5)    $Ca^{++} + SO_4^{--} \rightarrow CaSO_4$

Many methods for scale control have been devised, but there is still a need in the art to develop effective, low cost methods for large sea water conversion plants. Chemical additives have been used with success. Liddell, U.S. Patent No. 2,782,162 teaches the use of inorganic polyphosphates to inhibit scale formation in sea water evaporators. Neucom, U.S. Patent No. 2,844,412 teaches the use of starch phosphate and Ristiano, U.S. Patent No. 3,135,670 teaches the use of inorganic pyrophosphates. These chemicals called additives are used in parts-per-million quantities and are effective for scale control in evaporators up to approximately 190° F.

Acids and acid salts are used with success in sea water evaporators operating above 190° F. but they are limited to temperatures around 250° F., because calcium sulfate, unaffected by acids or acid salts, precipitates as scale on the evaporator heat transfer surfaces. Hillier (Proceedings of the Institute of Mechanical Engineers, vol. 1B, No. 7, 1953) teaches the use of ferric chloride, an acid salt, to reduce the alkalinity in sea water as an effective control against the alkaline scales. Checkovich, U.S. Patent No. 3,218,241 teaches the use of sulfuric acid followed by adequate decarbonation to reduce the alkalinity in sea water and thereby avoid the deposition of the alkaline scales. This acid, although less expensive than many of the previously mentioned chemicals, is increasing in cost. Also, it is a corrosive and dangerous liquid to handle. In its concentrated form, which is the way it is used, it tends to stream in the sea water and rapid and complete mixing with the sea water is difficult. This streaming also increases the chances for disastrous corrosion of the evaporator piping and associated equipment. Furthermore sulfuric acid is not effective against calcium sulfate scale. In fact, the addition of sulfuric acid increases the sulfate ion concentration and this will encourage a greater deposition of this form of scale.

A recent process, lime-magnesium carbonate (OSW Saline Water Conversion Report, 1966) can be employed to remove the calcium as calcium carbonate to avoid saturation of the sea water at temperatures of 300° F. and sea water concentrations of 1.15 with respect to calcium sulfate. This pretreatment process, as with other pretreatment processes, is costly and not economically feasible for sea water conversion plants below 10,000,000 gallons per day.

Pretreatment of the sea water by ion exchange techniques has avoided scale formation in evaporators. Mc-Ilhenny, U.S. Patent No. 3,056,651 and Worth, U.S. Patent No. 3,203,873, teaches the use of ion exchange resins to remove calcium and magnesium to levels where the precipitation of the three principal kinds of scales are avoided. These ion exchange techniques are costly and can be used only where special economic and technical factors demand their use.

BRIEF SUMMARY OF INVENTION

Briefly, the present invention comprises a method wherein carbon dioxide is injected into saline solutions which contain calcium and magnesium ions. These solutions are contained in a closed system to maintain the carbon dioxide in solution. The carbon dioxide reacts with the water to produce carbonic acid ($H_2CO_3$) which in turn ionizes to yield the hydrogen ($H^+$) and the bicarbonate ions ($HCO_3^-$). At some later time and other place in the system, the pressures are relieved by flowing into a container or chamber having free space. This reduction of pressure on the said solutions containing the bicarbonate ions cause the bicarbonate ions to decompose into carbonate ions ($CO_3^{--}$) and carbon dioxide gas, which is removed and recovered for reuse. The carbonate ions precipitate calcium. Under other conditions the residual carbonate ions in solution continue to breakdown into more carbon dioxide giving rise to hydroxyl ions ($OH^-$) which precipitate magnesium and certain other metallic ions as the hydroxides.

The apparatus required to practice this invention consists of two parts: a carbon dioxide injection system and a carbon dioxide release section. The carbon dioxide injection system consists of a carbon dioxide gas source (e.g. a lime kiln), a compressor for pressurizing the gas, and connecting piping. This system is connected to the evaporator heat exchange system carrying the said sea or saline water before evaporation. The carbon dioxide release section is a specially designed chamber to permit the removal of the precipitated salts. It is positioned in the evaporator system between the final heaters and the first evaporation zone of the conversion plant. In the multistage flash plant, for example, the carbon dioxide injection section is connected with the stage condensers at suitable positions. The carbon dioxide release section is positioned between the final brine heater and the first flash stage.

The present invention provides a method whereby a carbonic acid is produced by the interaction of carbon dioxide with the water and within the stream of the saline water flowing in the evaporator. The carbonic acid reacts with the alkalinity of the said saline solution to prevent the deposition of the alkaline scales on the heat transfer surfaces of the evaporator system. This invention provides a rapid and effective method for alkalinity reduction. In addition, the controlled addition of the carbon dioxide to produce carbonic acid within the bulk of the stream flow of the saline water eliminates serious corrosive conditions because the carbonic acid is formed in situ and is uniformly distributed throughout the bulk of the sea or saline water.

After the reaction of the said carbonic acid with the sea water is accomplished, the said sea water continues its passage through the heat imput sections of the evaporator plant. When the said sea or saline water are introduced into the free space of the carbon dioxide release section, the decomposition of the bicarbonates releases carbon dioxide and carbonate ions are formed which precipitates calcium as calcium carbonate. If temperatures above 200° F. are involved, hydroxyl ions may be formed by the reaction of water with the residual carbonate ions. The hydroxyl ions precipitate magnesium and certain other metallic ions as hydroxides. These precipitates are then removed from the specially designed carbon dioxide release chamber. The said sea or saline water then enters the first flash or evaporation chamber and contain less scale forming compounds. In the flash process, for example, when the discharged brine is recycled and mixed with new sea water, there is also much less calcium present to cause the deposition of calcium sulfate at the higher temperatures in the heat transfer section of the evaporator plant.

OBJECTS

Accordingly, it is an object of this invention to provide a method and means of reducing the formation of heat insulating materials on heat exchange surfaces within the evaporator itself.

Further, it is an object of this invention to prevent fouling on heat exchanger surfaces.

Still further, it is an object of the present invention to provide a method and means for preventing scaling of heat exchanger surfaces.

Further still, it is an object of this invention to provide a method and means of preventing scale formation in heat exchangers which treat saline waters.

Still other objects and advantages of this invention will become apparent from the following description of the invention.

DESCRIPTION OF THE PREFERRED EMBODIMENTS OF THE INVENTION

With respect to conditioning of sea water, a primary object of the present invention is to provide a method for distillation of sea water in which relatively high temperatures can be employed without scaling of the heat transfer surfaces. The use of high temperatures permits recovery of fresh water at a cost significantly less than is otherwise possible. It is within the purview of this invention to provide an economical method for scale control at relatively high distillation temperatures and brine concentration factors of the residue waters.

A further object of the invention is a method for the conditioning of sea water to provide a treated water of low corrosiveness so that low-cost materials can be employed for the construction of equipment or plants in which the sea water, brine, vapor, and distillate are handled.

With respect to improvement in the evaporation of fresh water from sea water, the invention is particularly concerned with evaporation processes in which a portion of the evaporation residue is recycled, and a primary object of the invention is to provide an improvement in sea water distillation process where recycle is employed.

Broadly considered, the method of the invention provides for conditioning sea water or other water of similar composition for recovering fresh water or potable water therefrom by the addition of carbon dioxide to the sea water or brackish water in such a manner that the hydrogen ion concentration (pH) of the solution is controlled to prevent the precipitation of the alkaline scales, which process has already been described previously in this disclosure. In the preferred method of this process, a controlled amount of carbon dioxide is pumped into the stage condensers of the heat recovery section by a compressor. The pH of the feed water as noted by the pH monitor drops from approximately 8.2, which is usually normal for sea water, to a value between 6.6 and 7.2. This will add sufficiently carbon dioxide to inhibit alkaline scale formation and also avoid acidic corrosive conditions. The feed water previously described then flows through the condensers of the carbon dioxide release section and the brine heater and enters the free space of the carbon dioxide release section, also previously described. The carbon dioxide release section is the heart of the process. When sea water, having been pretreated with carbon dioxide, enters the free space of this chamber, there will be an evolution of carbon dioxide gas from the bicarbonate breakdown. An abundance of carbonate ions will form to precipitate as calcium carbonate. As the temperatures of the sea water feed out of the brine heater rise above 250° F. and said sea water contains carbon dioxide as described heretofore, the chemical reactions which occur in the carbon dioxide release section are such that the hydroxyl ion may also be produced in quantity. Magnesium and other insoluble hydroxides will precipitate from said solution. The precipitates so formed can be also removed from the specially designed carbon dioxide release section. The brine flowing downstream will contain less calcium and magnesium so that in the recycled stream the potential for calcium sulfate will also be reduced. Carbon dioxide from the release section is recovered and recycled to the compressor for reuse. The precipitated calcium carbonate can be heated to provide make-up $CO_2$.

The effect of the pretreatment of the said invention is to modify the sea water composition so that calcium carbonate, magnesium hydroxide and calcium sulfate scales do not form to any objectionable extent on the heat transfer surfaces of the system or on other parts of the evaporator plant. This method for preventing scale is economical, more effective, and more efficient than other techniques used in the state of the art. The net effect is lower operating and maintenance costs, higher production of fresh water, and consequently lower cost for the product water.

What I claim is:

1. A method for removing at least one member of the group consisting of calcium and magnesium from an aqueous composition containing same which comprises injecting carbon dioxide gas into the composition whereby bicarbonate ions are formed; releasing the pressure on said composition to convert the bicarbonate ions to carbonate ions whereby calcium is precipitated as calcium carbonate and also to convert carbonate ions to hydroxyl ions whereby magnesium is precipitated as magnesium hydroxide and separating the resulting precipitates from the aqueous composition.

2. The method of claim 1 wherein said aqueous composition is saline water containing both calcium and magnesium and said calcium and magnesium are precipitated and separated from the said saline water before the latter is evaporated whereby undesired deposition of calcium and magnesium salts are avoided during evaporation.

3. The method of claim 2 wherein the saline water is heated between the carbon dioxide injection step and the pressure releasing step.

4. The process of claim 3 wherein the saline water subjected to evaporation after removal of calcium and magnesium is alkaline.

References Cited

UNITED STATES PATENTS

| 1,139,378 | 5/1915 | Schrempp | 210—56 |
| 2,756,029 | 7/1956 | Brogdon | 203—10 X |
| 3,218,241 | 11/1965 | Checkovich | 203—7 |

FOREIGN PATENTS

| 158,595 | 9/1954 | Australia. |

MICHAEL E. ROGERS, *Primary Examiner.*

U.S. Cl. X.R.

23—66; 203—7, 10